United States Patent

Van Kann et al.

[11] Patent Number: 5,505,555
[45] Date of Patent: Apr. 9, 1996

[54] FLEXURAL PIVOT BEARING

[75] Inventors: Frank J. Van Kann; Michael J. Buckingham, both of Claremont, Australia

[73] Assignees: RTZ Mining and Exploration Ltd., London, England; The University of Western Australia, Nedlands, Australia

[21] Appl. No.: 470,117

[22] Filed: Jun. 6, 1995

Related U.S. Application Data

[62] Division of Ser. No. 367,757, Jan. 3, 1995, which is a continuation of Ser. No. 115,677, Sep. 2, 1993, abandoned, which is a continuation of Ser. No. 688,528, Aug. 20, 1991, abandoned, continuation of PCT/AU89/00543, Dec. 20, 1989.

[30] Foreign Application Priority Data

Dec. 20, 1988 [AU] Australia .............................. PJ2034/88

[51] Int. Cl.⁶ .................................. F16B 7/00; G01P 1/00
[52] U.S. Cl. ........................ 403/291; 403/220; 73/382 R
[58] Field of Search ............................. 73/382 G, 382 R, 73/514.02; 403/291, 220; 248/543

[56] References Cited

U.S. PATENT DOCUMENTS

| | | |
|---|---|---|
| 3,052,127 | 9/1962 | De Mott . |
| 3,564,921 | 2/1971 | Bell . |
| 3,957,316 | 5/1976 | Armitage ................................ 403/291 |
| 4,023,413 | 5/1977 | Stauber .................................. 73/382 R |
| 4,694,703 | 9/1987 | Routson ................................ 403/291 X |
| 5,061,107 | 10/1991 | Brooks ................................ 403/291 X |

FOREIGN PATENT DOCUMENTS 2022243  12/1979  United Kingdom .

OTHER PUBLICATIONS

Misner et al., Gravitation, Ch. 36 "Generation of Gravitational Waves", 1971, pp. 974–978 and 991.
Derwent Pub. H8626B/37, Soviet Union No. 636,573, dated Dec. 1978.
derwent Pub. F7558W/22, Great Britian No. 1,395,971, dated May 1975.
Parke, J. W. et al. "Sensitivity Enhancement of Inertial Instruments by Means of a Superconducing Negative Spring" pp. 361–364 Jul. 31, 1984.
Chan, H. A. et al. "Superconducting Techniques for Gravity Survey and Inertal Navigation", pp. 411–414 Aug. 1984.
De Bra, D. B. et al. "A Proposed Lunar Orbiting Gravity Gradiomater Experiment" Apr. 1972.

*Primary Examiner*—Anthony Knight
*Attorney, Agent, or Firm*—Sughrue, Mion, Zinn, Macpeak & Seas

[57] ABSTRACT

A flexural pivot bearing includes a pair of members with opposed close-spaced faces which are joined by a web (29), of microscopic thickness, in a plane intersecting the faces. These members and the web are comprised of an integral body (27) of substantially uniform material, and the members are adapted for pivoted mutual flexure about a pivot axis aligned along the web.

4 Claims, 5 Drawing Sheets

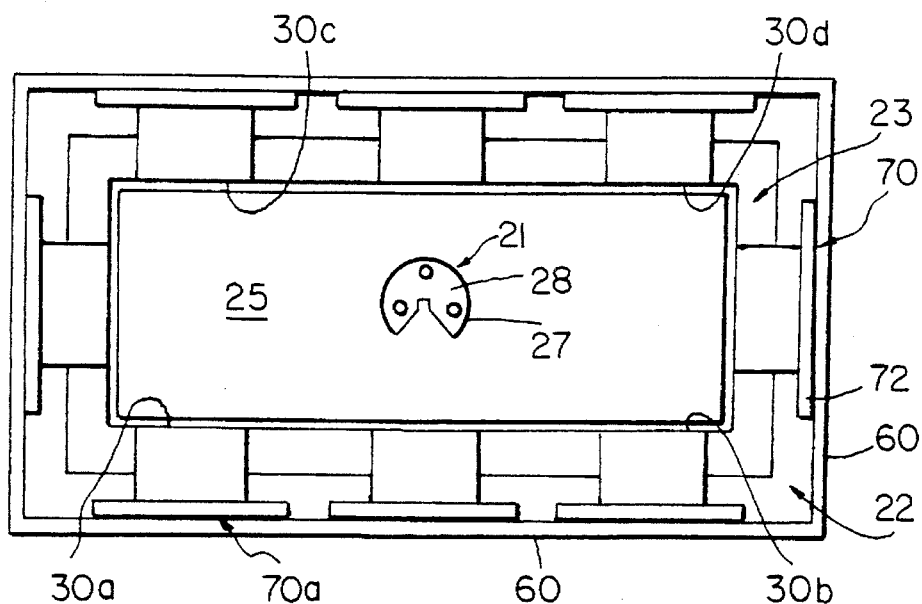
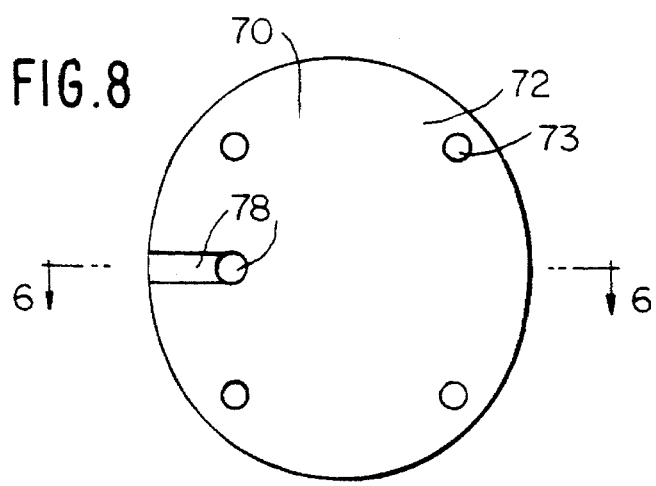
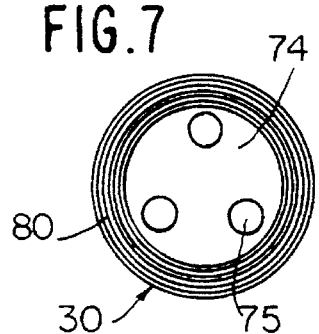
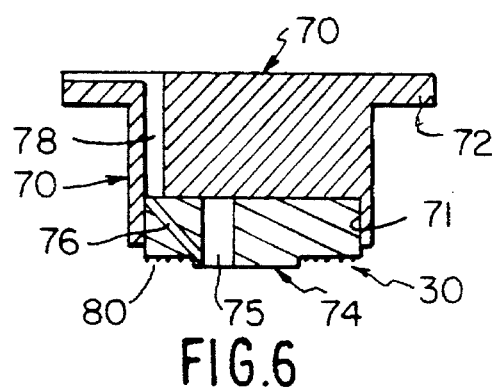

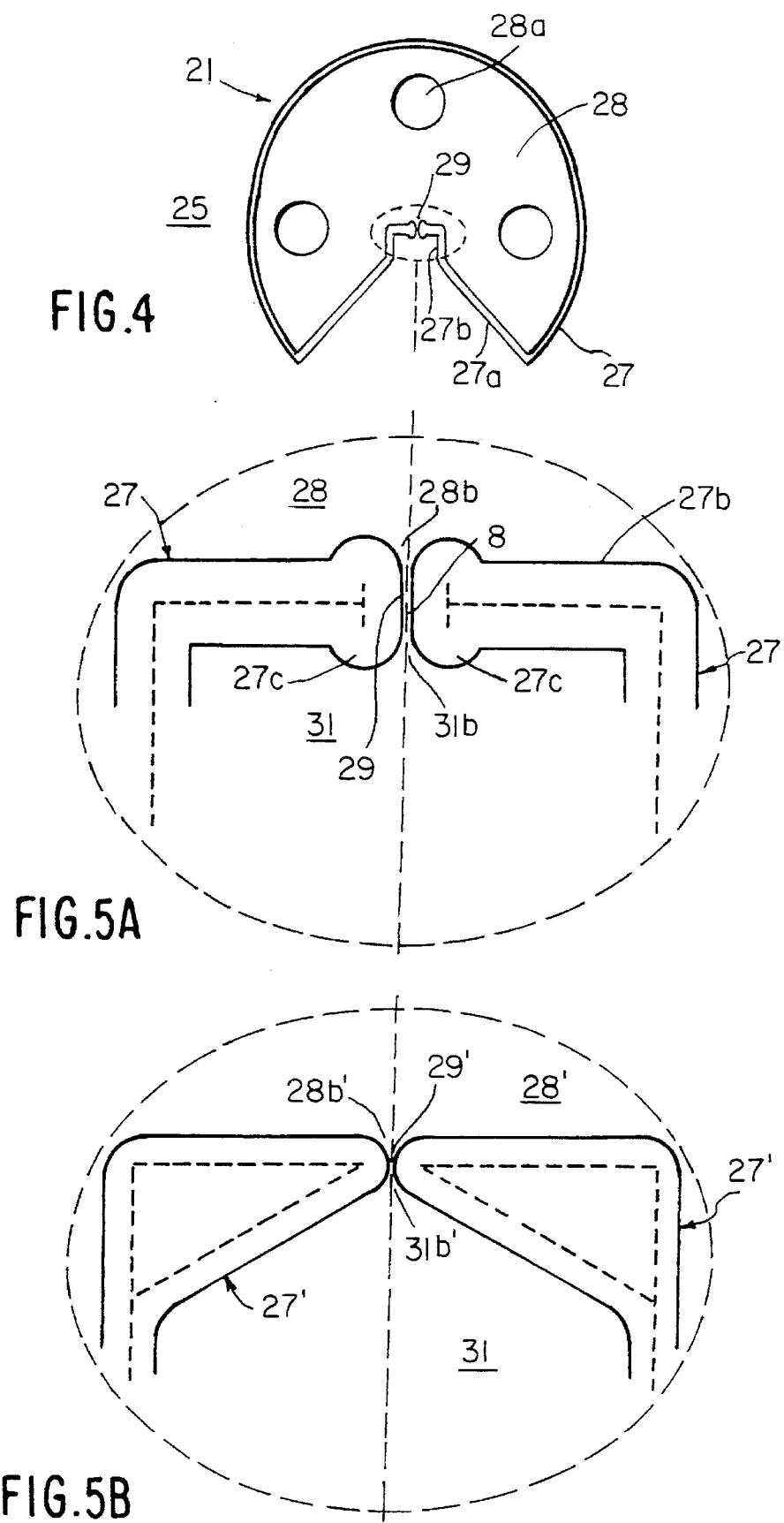

FLEXURAL PIVOT BEARING

CROSS REFERENCE TO RELATED APPLICATIONS

This is a divisional of application Ser. No. 08/367,757 filed Jan. 3, 1995, which is a continuation of patent application Ser. No. 08/115,677 filed Sep. 2, 1993 and now abandoned and which is a continuation of application Ser. No. 07/688,528 filed Aug. 20, 1991 and now abandoned which is a continuation of PCT/AU89/00543.

FIELD OF THE INVENTION

This invention relates to a novel flexural pivot bearing which has particular, though certainly not exclusive, application to gravity gradiometry.

BACKGROUND ART

The gravimeter is widely employed in geological surveying to measure the first derivatives of the earth's gravitational potential function—the gravity field. Because of the difficulty in distinguishing spatial variations of gravity from temporal fluctuations of the accelerations of a moving vehicle, these measurements can be made to sufficient precision for useful exploration only with land-based stationary instruments. This difficulty is in principle avoided by measurement of the second derivatives of the potential—gravity gradients—but only limited success has been met to date in developing a satisfactory gradiometer instrument. Gravity gradiometry is though especially appropriate to the location of geological structures bearing hydrocarbons, to geological mapping, and to locating high density (e.g., sulphides and iron ore) and low density (e.g., potash) mineral deposits.

Although it is not strictly correct to talk about the gradient of gravity, usage of the term has been universally adopted and will be used herein also. More formally, the second derivatives of the gravitational potential are termed gradients of gravity and constitute the gravity gradient tensor with components $g_{xx}$, $g_{xy}$ . . . $g_{zz}$, adopting the convention of taking the Z-axis parallel to the local vertical. There are nine such components, only five of which are independent since the tensor is apparently symmetric and the potential is a scalar field obeying Laplace's equation.

The key elements of a gravity gradiometer are a pair of substantially identical spaced masses and the object is to measure differences between the gravitational force on the respective masses. Effectiveness requires measurements of this difference when it approaches only one part in $10^{12}$ of normal gravity. Approaches to measuring gravity gradients have thus far fallen into two broad classes. The first of these entails differential modulation of a signal or parameter by the difference between the gravitationally induced accelerations of the two masses. The second technique involves direct measurement of the net gravitational acceleration of one mass relative to the other.

British patent publication 2022243 by Standard Oil Company discloses a gravity gradiometer in the first class. An element, described in the patent publication as a mass dipole but more properly termed a mass quadrupole, is mounted coaxially on one end of a photoelastic modulator element positioned in the cavity of a ring laser tube to differentially modulate circular polarization modes in response to application of a torque. In a preferred form, two mass quadrupoles are mounted on opposite ends of the modulator element to balance rotational acceleration noise. A closely related development by the same inventor, Lautzenhiser, described in U.S. Pat. No. 4,255,969, employs actual mass dipoles in conjunction with respective photoelastic modulator elements.

Another modulation technique involves rotating a platform which is supporting suitable arrangements of mass pairs. Various instruments of this kind are summarised by Jekeli at 69 EOS (No. 8). One of these, by Metzger, has been further developed and consists of electronically matched pairs of accelerometers on a rotating platform. The platform modulates the sum of opposing acceleration signals with a frequency twice its rotational frequency. These modulation systems call for extremely exacting uniformity in the rotation and require the use of bearing, rotational drive and monitoring technology which is not yet of a standard to render the instruments practicably suitable on an appropriate scale for airborne or moving land-based measurements for geophysical resource exploration, as opposed to geodetic surveying. The alternative of directly measuring gravity gradient components necessitates a very high degree of electronic magnetic thermal and vibration isolation to achieve the measurement accuracy needed. Machines thus far have had poor spatial resolution and a high noise level.

An instrument for measuring the diagonal components $g_{xx}$, $g_{yy}$ and $g_{zz}$ of the gravitational gradient tensor is described by van Kann et al in the publication IEEE Trans. Magn. MAG-21, 610 (1985) and further elaborated in the NERDDP End-Of-Grant Report (1986) on project No. 738. This instrument consists of a pair of accelerometers mounted with their sensitive axes in line. The difference in displacement of the accelerometers is proportional to the component of the given tensor gradient and is sensed by the modulated inductance of a proximate superconducting coil.

The term "superconducting" is used herein, according to the normal convention, to denote a material which at least is superconducting below a characteristic critical temperature. A suitable such material is niobium, which has a critical temperature of about 9K.

Parent patent application 627820 (48185/90) discloses a gradiometer incorporating a mass quadrupole. The pivotal flexural mounting for the mass quadrupole body may comprise a flexure bearing such as the commercially available Bendix pivot. It has been found, however, that this bearing is less than wholly satisfactory as it is constructed of several different metals secured together and this creates significant problems due to different thermal expansion coefficients and other parameter variations which become critical at the kind of accuracy desired in the present context.

SUMMARY OF THE INVENTION

The present invention therefore provides a flexural pivot baring which is suitable as the aforementioned mounting but which also has wider application. More particularly, the flexural pivot bearing of the invention includes a pair of members with opposed close-spaced faces. These faces are joined by a web, of microscopic thickness, in a plane intersecting the faces. The members and the web are comprised of an integral body of substantially uniform material, and the members are adapted for pivoted mutual flexure about a pivot axis aligned along said web.

The bearing is preferably cut from a single mass of a superconducting material such as niobium.

The two members of the bearing may be a generally annular body and a second body within the annular body.

BRIEF DESCRIPTION OF THE DRAWINGS

The invention will now be described in greater detail, by way of example only, with reference to the accompanying drawings in which:

FIG. 3 is a cross-section on the line 3—3 in FIG. 2;

FIG. 4 is an enlargement (5× magnification) of the flexural pivot bearing by which each of the mutually orthogonal mass quadrupole bars is supported in the gradiometer assembly and which comprises an embodiment of the invention;

FIG. 5A is a still greater enlargement (50× magnification) of the bearing in the region of the web;

FIG. 5B is a view similar to FIG. 5A of an alternative pivot bearing according to another embodiment of the invention;

FIG. 6 is a more detailed axial cross-section of one of the coil/coil holder assemblies;

FIGS. 7 and 8 are respective end elevations of the assembly shown in FIG. 6.

PREFERRED EMBODIMENTS

Figure 1:
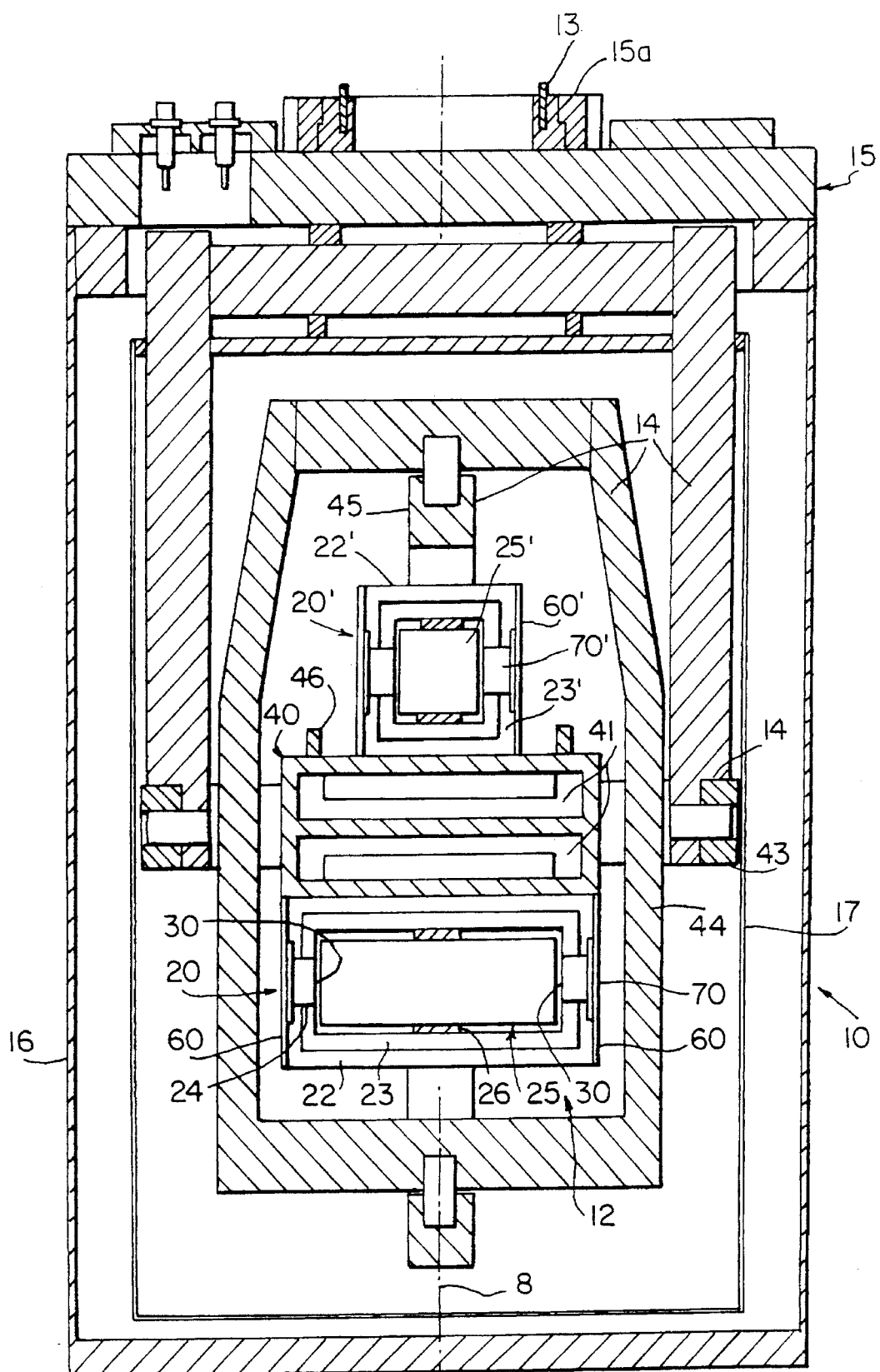
FIG. 1 is a diagrammatic axial cross-section of a gravity gradiometer assembly supported on a gimballed mounting within a vacuum can for rotationally stabilised cryogenic operation.

The illustrated apparatus 10 includes a gradiometer assembly 12 supported by a biaxial or triaxial gimballed suspension 14 within a vacuum can 16. Apparatus 10 forms a dewar probe which may be suspended inside a dewar (not shown) and immersed therein in liquid helium. The can 16 provides an evacuable enclosure which can thereby be maintained at or near liquid helium temperature for cryogenic operation of gradiometer assembly 12. A thermal shield 17 may be fitted about the gradiometer assembly to reduce radiative and gas conductive heat transfer between the gradiometer assembly and the vacuum can. The entire equipment including the dewar is readily capable of being mounted in an aircraft or other moving vehicle.

Gradiometer assembly 12 in fact includes two substantially identical gradiometers, 20, 20' oriented to measure $g_{xy}$ and $g_{yx}$ components of the gravitational gradient tensor. The gradiometers 20, 20' are bolted above and below a central box structure 40 and each includes a pair of rectangular box enclosures 22, 23 e.g. of niobium, arranged one inside the other and outer niobium side plates 60 forming a surrounding shield from electromagnetic radiation. Enclosures 22, 23 are typically niobium and provide two further levels of all-round electromagnetic shielding.

A solid bar 25 of superconducting material such as niobium is mounted on a bearing 21 within the inner enclosure 23 for fine pivotal flexure as a mass quadrupole about an axis 8 passing substantially through the centre of mass of the bar. The axes of flexure of the two bars 25, 25' are coincident and the bars extend in horizontal planes, mutually orthogonally in the x and y directions. The provision of a pair of orthogonal quadrupole bars permits net elimination of common mode rotational accelerations i.e., rotational noise at each bar. The gradiometers can, of course, be oriented differently depending on the gradient components of interest.

Each gradiometer 20, 20' further includes an array of superconducting coils 30 which are mounted on holders 70 in turn supported by the outer enclosure 22. Coils 30 are positioned in close proximity to quadrupole bar 25.

The dewar (not shown) would typically consist of an outer vacuum container, about 450 mm in diameter and 1.3 m high, and a 300 mm diameter inner well suspended from the mouth in the top of the outer shell by a fibreglass neck tube. The space between the inner well and the outer shell is permanently evacuated and typically fitted with thermal radiation shields surrounded by numerous layers of aluminised mylar superinsulation. Vacuum can 16 is supported within the dewar from an aluminium top plate which is attached to the mount of the dewar. The top plate and vacuum can are joined by a neck tube 13 through which the vacuum can is evacuated, for example, down to the range of $10^{-8}$ to $10^{-10}$ Torr. Gimballed suspension 14 is attached to a rigid 25 mm thick aluminium plate 15 which is bolted to the bottom flange 15a of the necked tube and also forms a lid for can 16.

Gimballed suspension 14 consists of three gimbal rings 43, 44, 45 mounted on flexural pivots (not detailed) such as Bendix crossed-web pivots. Suspension 14 provides a triaxial rotational isolation for gradiometer assembly 12 and further incorporates respective fibre optic rotation sensors (not shown) for the x and y axes and associated superconducting electro-mechanical diamagnetic actuators for active stabilisation in a servo circuit controlled by the rotation sensors.

Instead of fibre optic rotation sensors, an optical remote sensing arrangement may be employed, permitting the stabilisation to be physically separated and enable the utilisation of a room temperature gyroscope. In this arrangement (not shown), a collimated beam of light from a laser or luminescent diode attached rigidly to a room temperature gyroscopic inertial reference system is reflected by a plane mirror attached rigidly to the gradiometer assembly. Rotation of the gradiometer assembly about any axis orthogonal to the light beam can then be sensed by measurement of the angle between the incident and reflected beams. This is accomplished by means of a position sensitive photo-detector mounted rigidly to the light source with its planar sensing surface normal to the beam. The detector actually measures the x and y coordinates of the position of the spot of light from the reflected beam and this is used to monitor the relative orientation of the gradiometer assembly. Isolation against mechanical vibration, is not illustrated but may be provided in established ways.

Vibrations travelling along the external instrumentation leads to the dewar may be intercepted by the attachment of all cables near their mid-point to a massive lead block, itself suspended on a soft spring.

Figure 2:
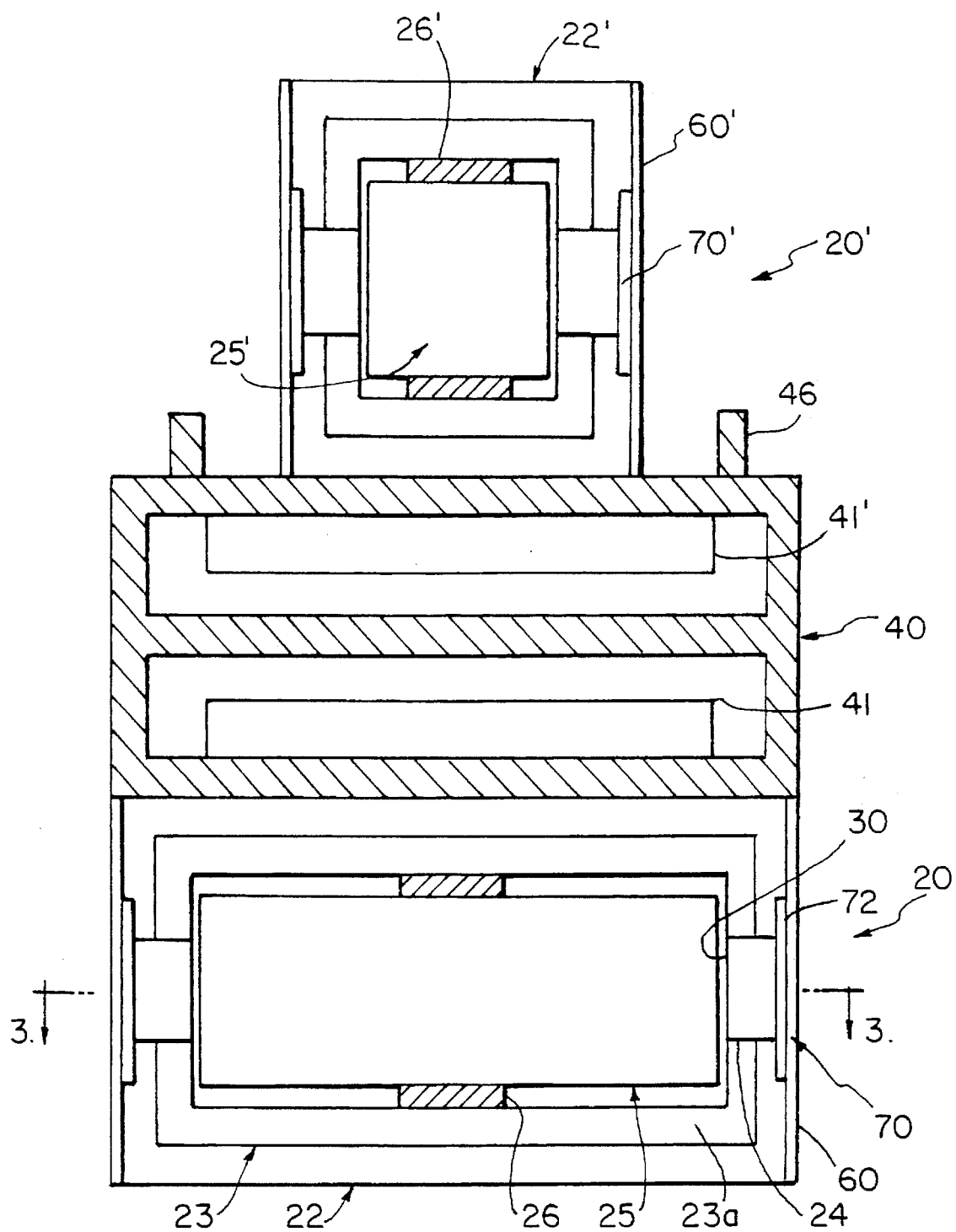
FIG. 2 is an enlargement of part of FIG. 1, showing the gradiometer assembly at actual size.

Each gradiometer 20, 20' is substantially identical and it is therefore now proposed to detail only the construction of gradiometer 20, with particular reference to FIGS. 2 and 3. As already mentioned, enclosures 22, 23 are of rectangular box-like configuration each made up of an assembly of top, bottom, side and end plates. Inner enclosure 23 is a close fit within outer enclosure 22 but arranged to be slid in and out on removal of the bottom plate of outer enclosure 22. The inner enclosure is provided with multiple circular openings 24 which respectively receive coil holders 70, and on its bottom plate 23a, with a bush 26 for the flexure bearing 21 that supports bar 25.

Flexure bearing 21 is detailed in enlarged FIGS. 4 and 5A, 5B and is formed by electric discharge machining (EDM) an almost continuous cut 27 through bar 25 parallel to axis 8, save for a microscopically thin web 29 extending the width of the bar along axis 8 at the centre of mass of the bar. In the example of FIG. 5A cut 27 defines a 270° part-cylindrical core 28 provided with three tapped holes 28a at one end for attachment of the core to bush 26. The core may of course be supported at both ends, if desired or necessary.

Further tapped holes (not shown) are provided in the bar to contain small screws whose position can be moved to partly achieve mass balance of the bar about axis 8. The radial portions 27a of cut 27 are deviated at their inner ends into right angle segments 27b which are aligned and separated by web 29. To either side of the web, the cut is bulged slightly at either side at 27c to lengthen the web and reduce its stiffness when acting as a pivot. Web 29 defines a micro-pivot some 0.030 mm thick, 0.200 mm long and 30 mm "wide", the width of bar 25. FIG. 5B shows an alternative cut to FIG. 5A.

It will be appreciated in particular from FIGS. 4 and 5A, 5B that core 28 and the adjacent inwardly projecting land 31 define a pair of members with opposed close-spaced regions 28b, 31b or 28b', 31b' joined by web 29 in a plane extending the width of the bar. These members are adapted for pivotal mutual flexure about a pivot axis aligned along web 29. It will also be noted that members 28, 31 and the web are comprised of an integral body of substantially uniform material, in this case niobium. More particularly, the quadrupole bar 25 is capable of fine pivotal flexure on micro-pivot web 29 between angular limits determined by contact between the opposed faces of the radial portions 27a of cut 27. This angular limit is about 3 degrees and in any event is about the amount which would give rise to inelastic deformation of the web.

The dimensions of bar 25 are selected as 30.00 mm square by 90.0 mm long, thereby producing a gradient sensor with a natural frequency of about 1 Hz in which the sensitivity to accelerations via elastic deformations of the bar and pivot web 29 are made relatively small.

The mounting of each superconducting coil 30 is best seen in FIGS. 6 to 8. Each holder 70, a machined piece of niobium, is of circular cross-section and has an outer peripheral retaining flange 72. The holder further has a co-axial inner recess 71 for a fiberglass coil former 74. The coil 30 is a pancake coil, i.e., a flat spiral wound on the exposed surface of former 74 and held in place by epoxy. The wire 80, necessarily superconducting and conveniently niobium with formvar insulation, enters the centre of the spiral via a diagonal entrance hole 76 in former 74, circulates the former several times and exits through a channel in the former. Holes 75 in former 74 are for temporarily clamping the assembly during winding. Both wire ends pass through a hole 78 in holder 70 and then along various channels (not shown) machined in the outer faces of enclosure 22 and through holes into enclosure 40.

Holders 70 are held in place in registered apertures 24 in the enclosures and are covered by one of the shield plates 60, secured in place on the outer enclosure 22 by screws 73 or the like. Plates 60, of which there are four on the sides of each enclosure 22, shield the wires 8 which run from coils 30 to enclosure 40. The inner end of each coil is substantially co-planar with the inner face of the inner enclosure 23, in close proximity to a face of the bar 25.

The coils 30 are disposed with their axes in a common horizontal plane, three along each side and one at each end of the quadrupole bar. The side coils are arranged in opposed coaxial pairs, one pair with its axis co-planar with axis 8 and the others towards each end of quadrupole bar 25. The end coils 30a, 30b on one side are utilised as push coils for diamagnetically applying a rotational force to, and augmenting the torsional stiffness of, the superconducting bar in the respective rotational directions about axis 8. The two opposite coils 30c, 30d on the other side are utilised for responding by modulation of their inductance to pivotal flexure of bar 25 arising from a gravitational gradient across the bar, the respective coils responding to flexure in the respective rotational directions about axis 8. The remaining four coils are also employed as sense coils, but for detecting translational movement of the bar in the x and y directions. The coils are substantially identical and may therefore be interchangeably employed as either push coils or sense coils, or both.

The push coils are required to provide feedback damping and to fine-tune the torsional resonant frequencies of the quadrupole bars to precisely match their response to common mode angular accelerations about the axis 8.

It will be appreciated that quadrupole bars 25 strictly need not be formed in solid superconducting material such as niobium, so long as they include superconducting material for interaction with coils 30. For example, each bar may be an aluminium mass lined with or treated to contain niobium at those parts of its surface which face the operational coils.

The eight coils of each set are wired in superconducting circuits as schematically depicted in FIG. 9 and detailed remarks concerning these circuits are set out hereinafter.

The superconducting wires 80 from the coils are fed through machined channels in enclosure 22 to a superconducting joint interface 41 within enclosure 40. The various required transformers are also housed within enclosure 40.

Further leads from this interface traverse feedthroughs 46 to the exterior of the assembly. The push coils are operated by employing heat switches to enable the insertion of controlled persistent currents while the means to detect inductance changes in the sense coils comprises one or more cryogenic SQUIDs (Superconducting Quantum Interference Devices) to sense differential motion. The heat switches and SQUIDs are housed within vacuum can 16. The switches and current source are typically under computer control.

As the SQUID sensing system is very sensitive to extremely small changes in magnetic flux, all leads and components are shielded by closed superconducting shields, e.g., of fine niobium tubing. External fields are exponentially attenuated as they enter the enclosure provided by the shields; the geometry of the tubing is designed so that the earth's ambient magnetic field produces less than one flux quantum inside the shield.

The illustrated apparatus, operated cryogenically, is capable of measuring angular displacements of the order of $10^{-12}$ radians. It will be understood that materials other than niobium may be employed in the construction of the illustrated assembly. It is preferred however that the materials chosen have similar coefficients of thermal expansion, and that at least wires, wire shields and bar surfaces are formed in superconducting material. The enclosures, for good temperature control are desirably made in a material which is a good conductor of heat to minimise temperature gradients across the gradiometer. The preferred material for the gradiometer body (bars, enclosures, shields) is niobium.

The preferred circuitry for the gradiometer consists of five circuits of three different types. These are the MAIN READOUT (FIG. 9A), the ACCELERATION MONITOR CIRCUITS (FIG. 9B) and the PUSH CIRCUITS (FIG. 9C). There are two acceleration monitor circuits, for measuring accelerations in the x and y directions, and two push circuits, for the respective bars 25, 25'. Before describing the three circuit types some general notes are appropriate:

1. The apparatus can, in principle, be oriented to measure any of the off-diagonal components of the gravity gradient tensor. Throughout the drawings, the figures all show a gradiometer with the z axis parallel to the vertical. FIG. 3, which shows the x axis parallel to the long axis of the bar, is the cross section of the lower coil enclosure as shown in FIG. 2. That is, the x axis is parallel with the long axis of the bottom quadrupole bar 25 and the y axis is parallel with that of the top bar 25'.

2. In the circuits, the pancake coils used for sensing a superconducting surface of a bar are labelled according to their usage. Thus, PUSH 1 and PUSH 2 are push coils, X and Y are acceleration sense coils and $\theta+$ and $\theta-$ are rotation sense coils.

3. The circuits consist of several elements. The output of each circuit is from a SQUID whose input is coupled to the rest of its circuit by means of a shielded toroidal air-cored transformer. Hence there are five SQUIDS, one for each circuit.

4. The inductors are of two types: toroidal or flat spiral (pancake). All the coils which face a quadrupole bar surface are pancake coils. The remainder of the inductors are toroidal.

5. In the illustrated instrument, a "heat switch" consists of a heater in close thermal contact with a thin superconducting tube which contains a loop of superconducting wire in good thermal contact with the tube but electrically insulated from it. The tube provides electromagnetic shielding for the loop which is a part of the superconducting circuit. By activating the heater, a part of the loop may be heated to a temperature above its superconducting transition temperature. This non-superconducting part then becomes an electrical resistor which will dissipate any current passing through the loop and will allow the injection of a new current via the pump leads.

In general, the design of heat switch may be refined or replaced by some other method which allows the dissipation and injection of currents in the superconducting circuits.

Although in principle, a gravity gradiometer is intrinsically insensitive to linear accelerations, in practice these accelerations may have effect because of limitations in the achievable common mode acceleration rejection ratio and because of second order effects induced by elastic deformations of the micropivot web 29 and quadrupole bar 25, 25'. Consequently, accelerometers are required for the measurement of accelerations so that the acceleration effects may be appropriately subtracted from the gradient signal and so that the accelerations may be recorded for any subsequent analysis of the data.

The motion of the quadrupole bar 25 or 25' as a result of the aforementioned elastic deformations may be used as an accelerometer, or separate accelerometers may be mounted on board the gradiometer package to perform this function. In any case, two accelerometers are used, each measuring the linear accelerations parallel to the long axis of a quadrupole bar. These are labelled X and Y according to the directions of these axes. The two acceleration monitor circuits (a representative one of which is shown in FIG. 9B), also labelled X and Y, simply perform the function of providing acceleration data for recording.

The two push circuits (one for each bar) are identical and only one is therefore shown in FIG. 9C. The following description for one applies equally to the other.

The push circuit loop carries a persistent current which can be adjusted and stored. The resulting magnetic flux in the loop means that the push coils act as magnetic springs thereby increasing the mechanical torsional resonant frequency of the quadrupole bar. This technique is used to match the torsional resonant frequencies of the two bars. The rejection of angular accelerations about the z axis depends on how well these frequencies are matched. Modulations of the current will result due to angular motion of the bar and these are sensed by coupling the push loop to a SQUID. This output can be used in feedback to servo control angular accelerations about the z axis.

Figure 9A:
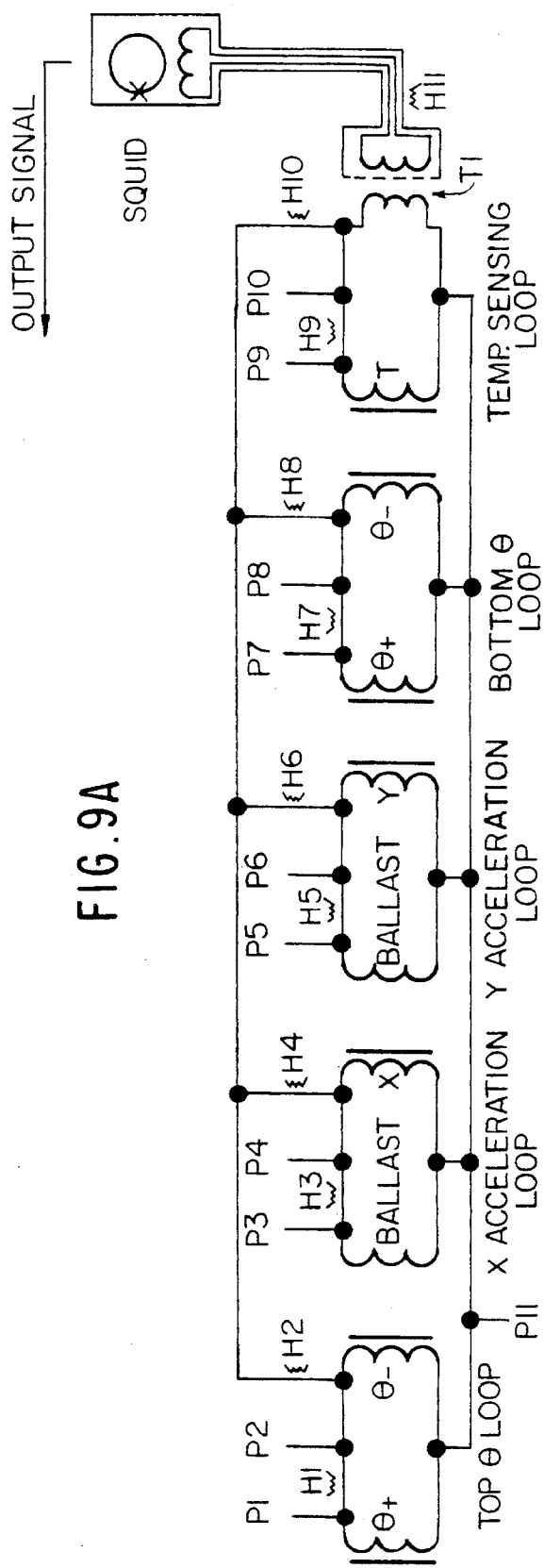
FIGS. 9A–9C are schematics of the superconducting circuit for the gradiometer.
Figure 9B:
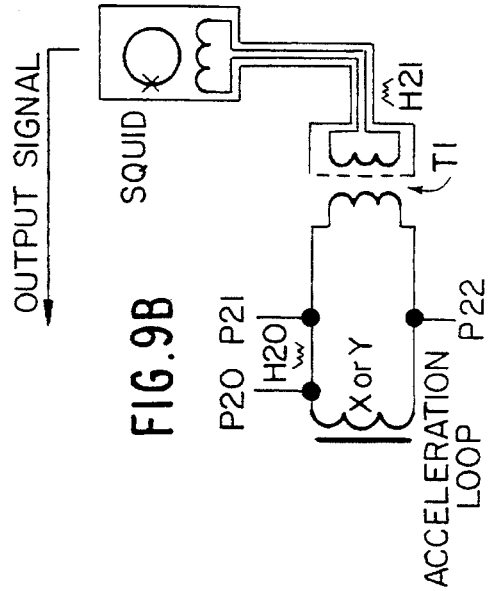
Figure 9C:
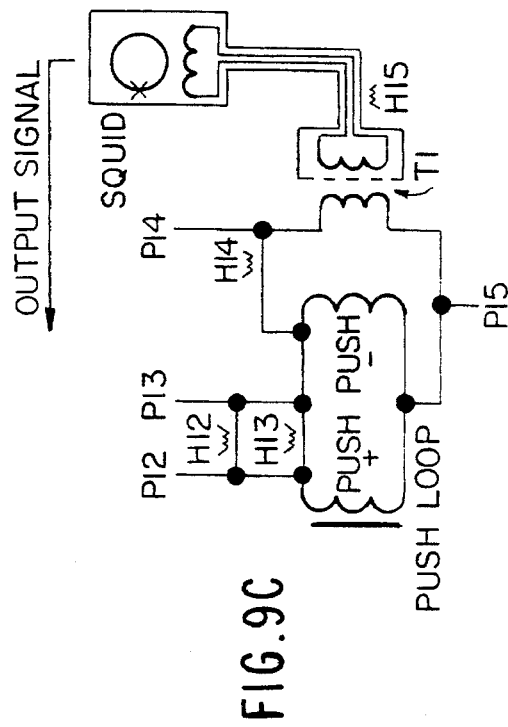

The main readout circuit depicted in FIG. 9A performs the function of combining the angular information from each of the responders together with the x and y acceleration information to provide a temperature compensated output signal proportional to the gravity gradient. There are five loops, in each of which the magnetic flux can be independently set and then locked. These are: the $\theta$ loop for the top bar, the $\theta$ loop for the bottom bar, the X acceleration loop (bottom bar); the Y acceleration loop (top bar); and finally a temperature sensing loop, into which the SQUID input transformer is coupled. Flux in the X,Y loops is trimmed so that the SQUID output is independent of these two accelerations. Similarly the flux in each of the two loops is set to cancel the effects of rotational acceleration about the z-axis. The temperature loop flux is adjusted to make a first order cancellation of small temperature inhomogeneities in the gradiometer.

We claim:

1. A flexural pivot bearing comprising a pair of members with opposed close-spaced faces, which faces are joined by a web, of microscopic thickness, in a plane intersecting the faces, wherein said members and said web are comprised of an integral body of substantially uniform material, and said members are adapted for pivoted mutual flexure about a pivot axis aligned along said web.

2. A flexural pivot bearing according to claim 1, wherein said bearing is cut from a single mass of a superconducting material.

3. A flexural pivot bearing according to claim 2, wherein said two members of the bearing are a generally annular body and a second body within the annular body.

4. A flexural pivot bearing according to claim 1, wherein said two members of the bearing are a generally annular body and a second body within the annular body.

* * * * *